United States Patent [19]
Jones, Jr.

[11] 3,885,441
[45] May 27, 1975

[54] DASHBOARD MOUNT FOR AUXILIARY AUTOMOBILE INSTRUMENT

[75] Inventor: John Paul Jones, Jr., Wayne, Pa.

[73] Assignee: Air Products and Chemicals, Inc., Allentown, Pa.

[22] Filed: Feb. 14, 1974

[21] Appl. No.: 442,424

Related U.S. Application Data

[63] Continuation of Ser. No. 275,044, July 25, 1972, abandoned.

[52] U.S. Cl. ................................................ 73/431
[51] Int. Cl. ........................................... G01d 11/24
[58] Field of Search ......... 248/27, 313, 316; 73/431

[56] References Cited
UNITED STATES PATENTS 1,422,676  7/1922  Czarnecki ......................... 248/313
2,548,954  4/1951  Davis .................................... 73/431
3,350,045  10/1967  Mayers ........................... 248/205 A Primary Examiner—William H. Schultz
Attorney, Agent, or Firm—James C. Simmons; Barry Moyerman

[57] ABSTRACT

An auxiliary instrument having an open ended back casing is removably mounted on an automobile dashboard in a visible position by a friction spring clip assembly affixed to the dashboard surface by an adhesive layer. The friction spring clip slips back over the back edge of the casing and extends into the open back end to avoid any protruding structure on the casing, which is thereby removably held in place by the simple expedient of frictionally forcing backward into the spring clip.

1 Claim, 1 Drawing Figure

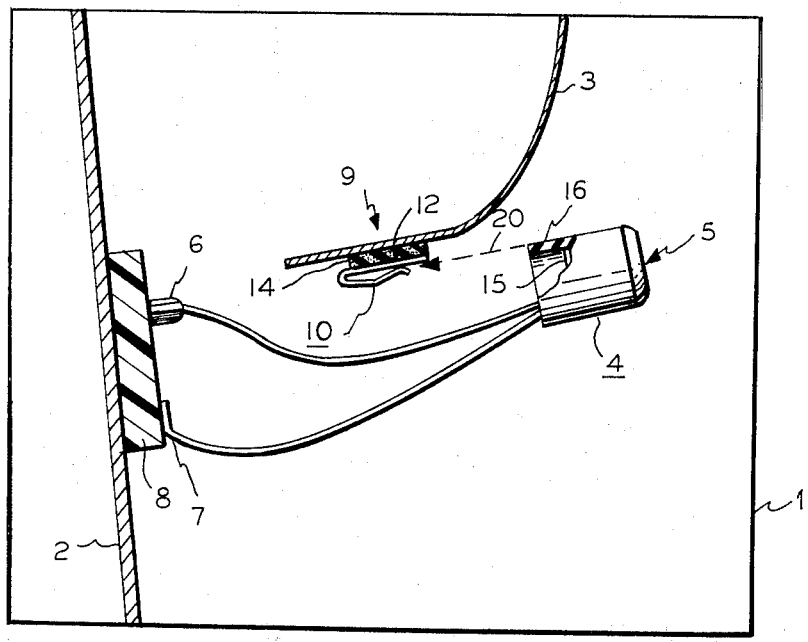

DASHBOARD MOUNT FOR AUXILIARY AUTOMOBILE INSTRUMENT

This is a continuation of application Ser. No. 275,044, filed July 25, 1972, now abandoned.

This invention relates to mounting structure for removably mounting an instrument casing and more particularly it relates to mounting means holding an auxiliary instrument in a visible position on the dashboard of an automobile.

It is necessary to mount auxiliary instruments purchased after assembly of an automobile neatly in a visible position on the dashboard. An assembly should be useful on various types of cars and models, and should avoid if possible all requirements for tools, drills, screws, etc. to simplify mounting and to present a favorable appearance.

Some instruments such as an elapsed engine hour meter of the type described in my U.S. Pat. No. 3,355,731 issued Nov. 28, 1967, require servicing for replacement of expended parts and thus should be removably mounted for ready and convenient access.

Accordingly it is an object of this invention to provide improved mounting means.

A further object of the invention is to provide improved instrument mounting means for removably placing in a visible position on the dashboard of an automobile.

Thus in accordance with this invention, an instrument is mounted in a generally rectangular casing with a visible front panel and an instrument panel recessed in the rear to permit side sections of the casing to engage a spring clip assembly adhesively mounted to a dashboard of an automobile.

The foregoing and additional features and objectives of the invention are set forth throughout the following description of a preferred embodiment of the invention which refers to the accompanying drawing wherein a block sketch of a cross section of a portion of an automobile cockpit is shown.

In the drawing the block 1 includes a sketch of a part of an automobile cockpit showing the fire wall 2 and an outline of the dashboard 3.

A rectangular instrument case 4 having a front viewing panel 5 has electrical leads 6, 7 attached to a fuse block 8, and is physically mounted under the dashboard 3 at location 9 by means of a spring clip member 10 of resilient metal such as stainless steel or phosphor bronze into which the casing of instrument 4 slides and is frictionally held by the friction clip portion 11 against a planar area 12 of the order of one square inch in area.

A layer 14 of adhesive material affixes the planar area 12 to the dashboard 3. Preferably this is an elastic layer about one-sixteenth inch thick of a suitable adhesive such as urethane foam with an adhesive surface on both sides commercially available from Minnesota Mining and Manufacturing, for example. This type of material may be adhered to the clip and protected with a removable paper non-adhering layer on the upper surface until ready to mount on a suitable position on the dashboard 3. It will provide a good bond between "flat" or rough surfaces because of the conformity of the foam material.

The instrument case 4 has a recessed rear panel 15 which may for example be a printed circuit with corresponding labels or indicia substantially closing the instrument compartment. This permits the side panels or walls 16 of the case to extend laterally for frictionally inserting between the clip portion 11 and the planar area 12 of the clip assembly 10. With this configuration the clip could engage on the top panel 16 as indicated by the arrow 20, or on a side or bottom extended panel section.

Accordingly the assembly is readily mounted in a good viewing position on the dashboard area of various cars simply and without tools and can be removed for inspection or service access without disconnecting wires 6, 7 or removing bolts, etc.

The clip 10 is formed by bending back a strip of spring stock in the shape of the clip 10 shown in cross section view in the drawing so that the panel 16 of known thickness may be frictionally engaged on a line about 1 inch long at the mouth of the clip with a predetermined spring bias pressure holding the casing 4 firmly in position. The relatively thick adhesive layer 14 will conform with graining and will adhere to either metal, plastic or fabric coverings used on automobile dashboards. The cement may be of either the pressure sensitive type or that activated by a solvent such as water or petroleum derivates, if desired.

What is claimed is:

1. A mounting structure for an auxiliary instrument on a dashboard of an automobile comprising in combination a spring clip member of resilient metal having a planar area with a friction clip portion extending therefrom and bent back towards said planar area in a shape to frictionally engage a panel section inserted between the clip portion and the inner surface of said planar area, and an adhesive layer on the outer surface of said planar area of such material that will engage the exposed surface of an automobile dashboard wherein said instrument is housed in a casing having a laterally extending back panel section and a visible front indicator panel, said laterally extending back panel section being disposed between said clip portion and the inner surface of said planar area, wherein said casing has recessed in the open back an instrumentation compartment closure substantially closing the rear portion of said casing.

* * * * *